(12) United States Patent
Lafabrie et al.

(10) Patent No.: US 10,009,634 B2
(45) Date of Patent: Jun. 26, 2018

(54) METHOD TO IDENTIFY AT LEAST ONE CONTENT WITHIN A DATA STREAM

(75) Inventors: Emmanuel Lafabrie, Issy-les-Moulineaux (FR); Salvatore Bocchetti, Lausanne (CH); Bravo Pedro Lagunas, Lausanne (CH); Frédéric Thabaret-Diebold, Thonon-les-Bains (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 33 days.

(21) Appl. No.: 14/342,746

(22) PCT Filed: Sep. 5, 2012

(86) PCT No.: PCT/IB2012/054570
§ 371 (c)(1),
(2), (4) Date: Jun. 4, 2014

(87) PCT Pub. No.: WO2013/035040
PCT Pub. Date: Mar. 14, 2013

(65) Prior Publication Data
US 2014/0304752 A1    Oct. 9, 2014

Related U.S. Application Data

(60) Provisional application No. 61/531,035, filed on Sep. 5, 2011, provisional application No. 61/531,145, filed on Sep. 6, 2011.

(51) Int. Cl.
*G06F 21/10* (2013.01)
*H04N 21/4405* (2011.01)
(Continued)

(52) U.S. Cl.
CPC ... *H04N 21/23418* (2013.01); *H04N 21/4347* (2013.01); *H04N 21/4405* (2013.01);
(Continued)

(58) Field of Classification Search
None
See application file for complete search history.

(56) References Cited

U.S. PATENT DOCUMENTS 5,530,959 A * 6/1996 Amrany ............ H04L 25/03866
380/268
5,930,361 A * 7/1999 Hayashi ............... H04N 7/1716
348/E7.061

(Continued)

FOREIGN PATENT DOCUMENTS

CN       1889059       1/2007
EP       1 916 603     4/2008
(Continued)

OTHER PUBLICATIONS

International Search Report issued in International Application No. PCT/162012/054570 dated Dec. 11, 2012.
(Continued)

*Primary Examiner* — Nasser M Goodarzi
*Assistant Examiner* — Terrika Peterson
(74) *Attorney, Agent, or Firm* — DLA Piper LLP (US)

(57) ABSTRACT

A method to identify content within a data stream, comprising: capturing a data stream, analyzing and filtering the data stream by isolating a test stream of the data stream and disabling the other sub-streams, applying the test stream to the application so as to produce an output, applying the output to a comparator, the comparator receiving a reference and determining by the comparator a distance between the application output and the reference, if the distance is below a predefined level, repeating the isolating step with a new test stream selected among the previous test stream, the new test stream being a subset of the previous test stream, if that the distance is above or equal a second predefined level, repeating the isolating step by selecting a different test
(Continued)

stream from the data stream not already applied to the application.

19 Claims, 1 Drawing Sheet

(51) Int. Cl.
    *H04N 21/234*     (2011.01)
    *H04N 21/434*     (2011.01)
    *H04N 21/4402*     (2011.01)
    *H04N 21/472*     (2011.01)
    *H04L 25/03*     (2006.01)
    *H04N 21/438*     (2011.01)
    *G06K 9/00*     (2006.01)
    *G11B 20/00*     (2006.01)
    *H04L 9/08*     (2006.01)
    *H04N 17/00*     (2006.01)
(52) U.S. Cl.
    CPC ............... H04N 21/440245 (2013.01); H04N 21/47211 (2013.01); *H04N 17/004* (2013.01)

(56) References Cited

U.S. PATENT DOCUMENTS

| | | | |
|---|---|---|---|
| 7,515,712 B2* | 4/2009 | Wasilewski | H04L 63/0428 380/210 |
| 2001/0010720 A1* | 8/2001 | Kimball | H04N 7/162 380/241 |
| 2002/0080971 A1* | 6/2002 | Fukami | H04N 5/76 380/277 |
| 2005/0094648 A1* | 5/2005 | Van Den Heuvel | H04N 21/4383 370/395.64 |
| 2006/0117356 A1* | 6/2006 | Jojic | G06F 17/30811 725/88 |
| 2006/0195861 A1* | 8/2006 | Lee | G06K 9/00523 725/19 |
| 2007/0133797 A1* | 6/2007 | Schipper | G06Q 20/1235 380/231 |
| 2007/0294170 A1* | 12/2007 | Vantalon | G06F 21/10 705/50 |
| 2008/0104576 A1* | 5/2008 | Kaksonen | G06F 11/3672 717/124 |
| 2008/0109841 A1* | 5/2008 | Heather | G06Q 30/02 725/32 |
| 2008/0313463 A1* | 12/2008 | Depietro | H04N 7/1675 713/170 |
| 2009/0097659 A1* | 4/2009 | Candelore | H04L 9/0833 380/278 |
| 2010/0272186 A1* | 10/2010 | Yeh | H04N 5/765 386/248 |
| 2013/0121485 A1* | 5/2013 | Boivin | H04N 21/4405 380/2 |
| 2013/0129082 A1* | 5/2013 | Westerveld | G11B 20/00086 380/28 |

FOREIGN PATENT DOCUMENTS

FR               2963191 A1 *     1/2012           H04N 21/4385
WO     WO 2012010706 A1 *     1/2012           H04N 21/4405

OTHER PUBLICATIONS

Written Opinion issued in International Application No. PCT/IB2012/054570 dated Dec. 11, 2012.
English language abstract of CN 1889059 published Jan. 3, 2007.

* cited by examiner

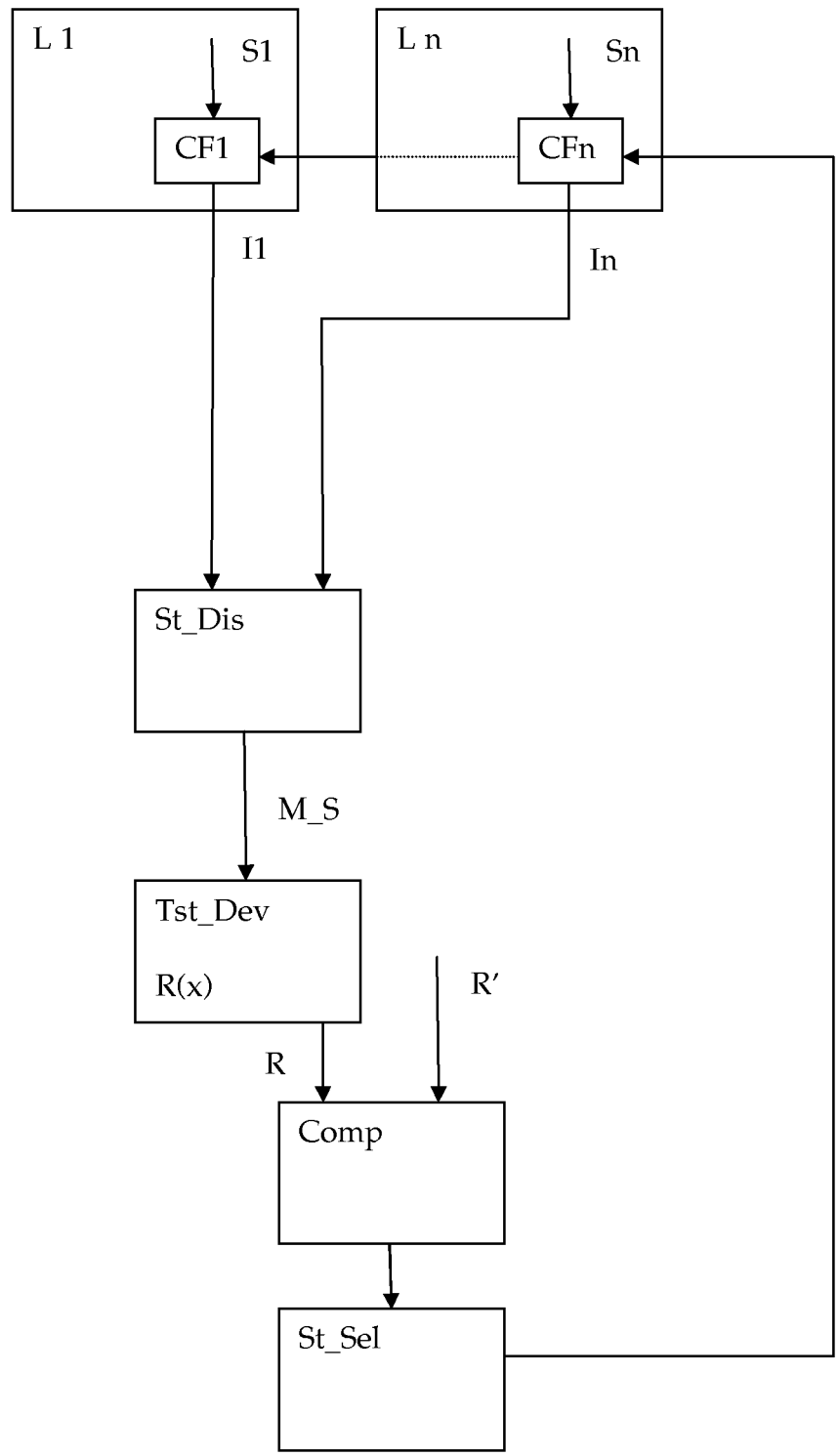

US 10,009,634 B2

METHOD TO IDENTIFY AT LEAST ONE CONTENT WITHIN A DATA STREAM

CROSS-REFERENCE TO RELATED APPLICATIONS

This application is a National Stage of International Application No PCT/EP2012/054570, which claims priority to U.S. Provisional Patent Application Nos. 61/531,035 filed Sep. 5, 2011 and 61/531,145 filed Sep. 6, 2011.

INTRODUCTION

The present invention concerns a method to identify at least one content within a data stream, said content being needed by a given application executed on a test device.

BACKGROUND ART

The aim of the invention is to detect content needed by a given application, whose implementation (hereafter the test device) is available as a "black-box" (i.e., a device that can be analysed externally by observing its reaction (output R) to different inputs I1, . . . In).

One particular field of application is Pay-TV field in which the content plays the role of security messages and the data stream is the video data broadcast by a satellite.

Some pirates use a satellite ISP or private satellite connection to broadcast via satellite the control words "CWs" (which are one example of the security messages) protecting a payTV operator's content. The control words are extracted from a genuine security module and spread to users having subscribed to this pirate service.

The Satellite Key Sharing pirate STBs or dongles will then only need satellite feeds to get either the video scrambled and the CW to descramble. The pirate decoder receives the audio/video stream in the same manner as the genuine user i.e., through satellite or terrestrial signal and connects in parallel their decoder to this CW stream service. The control word is then passed to the decoder to decrypt the audio/video content and to obtain the audio/video in clear. Each control word is used to encrypt a part of the audio and video stream (A/V stream). A slice of A/V stream encrypted with the same control word composes a crypto period.

Pirates may change the satellite ISP or private satellite connection very often, so identification of the pirate feed requires fast and automatic tools.

Furthermore, to identify illicit CWs within the satellite streams, the analyzing tools need to access to the satellite beams' footprint.

Depending on the location of the footprint and of the personnel performing the analysis operations, limited internet connectivity may be available between the two, hence requiring optimized solutions to reduce traffic.

As it is well known, in such Pay-TV systems that use a security module, the content is encrypted by means of control words and is then sent to multimedia units connected to a data or content supplier. The controls words are sent to multimedia units in an encrypted form in control messages (ECM). These control messages (ECM) are transmitted by the decoder of the multimedia unit to the security module of this unit. If the decryption rights are present, the control messages are decrypted in order to extract the control words. Said control words are returned to the decoder that uses them to decrypt the content.

BRIEF DESCRIPTION OF THE INVENTION

According to the invention, a method to identify at least one content within a data stream is provided, said content being needed by a given application executed on a device, this method comprising the steps of:

a) capturing at least one data stream,
b) analyzing and filtering the data stream by:
c) isolating at least one test stream of the data stream and disabling the other sub-streams, and applying the test stream to the application so as to produce an output (R),
d) applying the output to a comparator (comp), said comparator receiving a reference (R') and determining a distance (D) between the application output (R) and the reference (R'), when the distance (D) is below a predefined level (L), repeating step c) with a new test stream selected among the previous test stream, the new test stream being a subset of the previous test stream, and
when the distance (D) is above or equal to a second predefined level (L2), repeating step c) by selecting a different test stream from the data stream not already applied to the application.

BRIEF DESCRIPTION OF THE FIGURE

The present invention will be better understood thanks to the attached FIGURE in which the various elements of the invention are illustrated.

FIG. 1 illustrates the different elements playing a role in the present invention.

DETAILED DESCRIPTION

The test device (Tst_Dev) implements the application under examination. It is fed with the modified stream (M_S) comprising at least one test stream captured and filtered by the controlled filters (CF) and synchronized by the stream dispatcher (St_Dis). The application (R(x)) is implemented within the test device (Tst_Dev), however the latter is available as a "black box". The output of the test device (Tst_Dev) if function of its internal status and of its inputs: Output=R(I1, . . . , In, Status).

The controlled filters (CF) are in charge of capturing one or more data streams (S1, . . . , Sn) (for instance, from one or more satellite(s)), and obtaining the modified stream containing the test stream from the data stream following the instructions of the stream selector and of handing over a new modified stream (hereafter the test streams Ix, . . . , Iy) to the stream dispatcher (St_Dis). This method requires at least one controlled filter. A controlled filter may disable some of the sub-stream of a data stream by one of the methods described below. A sub-stream is a part of the data stream identified by one or more common characteristics; the characteristic of the sub-stream is composed of a characteristic type (e.g., "packet identifier", "IP Address", "payload pattern", etc.) or a characteristic value (e.g., the number of the packet identifier, a given IP Address, a mask of IP Address, a pattern for the payload, . . . ). The characteristic defining a given sub-stream is referred to herein as the SSC.

Three methods to disable part of the data stream, thus forming the modified stream are proposed. The non-disabled part of the data stream is called test stream. The first method is to remove the sub-streams that are not part of the test stream. The data stream is then cut to remove some of the sub-streams and only the test-streams are sent to the test device.

The second method is to modify the sub-streams that are not part of the test stream. This modification has the aim of avoiding the interpretation of the data by the test device.

This can be achieved through the identification of the payload and the modification of said payload, either by a constant or by random data.

Another way to disable the data is to modify the header so that the rest of the data has no meaning.

The third method is to act on the signalization of the data stream. The data stream comprises a signalization table (PAT) describing all available services, the services being then linked to a plurality of sub-streams. This table will be modified to hide some of the services to leave in the data stream only the test-streams visible.

The stream forwarded by the controlled filter to the stream dispatcher is the modified data stream (M-S). The modified stream comprises at least the test streams and, depending on the disabling method, the other sub-streams.

The stream dispatcher (ST_Dis) receives the modified stream from the different controlled filters, ensures the synchronization among the modified stream and feeds it to the test device. The transfer of the feeds between the controlled filters and the stream dispatcher may happen remotely (e.g., via the internet), hence the bandwidth between the components may be a critical factor and the modified stream to be forwarded to the stream dispatcher must be accordingly selected by the stream selector. In the particular case of Pay-TV Satellite Key Sharing, the stream dispatcher has the function of synchronizing at least two streams, one being at least a modified stream and the other one being either a non-modified or a modified stream. The stream dispatcher synchronizes the modified stream (containing the test streams which contain the security messages embedding the control word) with the stream containing the audio/video content, in order to have the correct control word fed to the test device during each crypto period. The security messages can be any data of particular interest to be located into the data stream. In Pay-TV, we understand these messages to be the Entitlement Management Messages (EMM), containing the rights and various configuration for the security module or the Entitlement Control Messages (ECM) containing the control word. The stream of audio/video content can also be filtered to have a modified stream having only a subset of services.

The comparator (Comp) receives the input of the test device and compares it to a reference output R' (for example, for the SKS, R'=the presence of descrambled video in the TV). The comparator provides to the stream selector an indicator of the distance D between the output of the test device and the reference output R': D=(d(R(I1, ... In status), R'). A first predefined level L1 is then used to decide if the application is working satisfactorily and therefore the iterations can stop. The last test stream used, identified by the SSC, is then used for later analysis and action. When the distance D is above a second predefined level L2, the current test stream is discarded and other test streams are selected. The first and the second predefined level can have the same value. The value of the distance D between the first and the second predefined level is then used to determine that the test stream is promising but not precise enough to stop the iteration. This test stream is then used to define a smaller test stream within the previous test stream. This first predefined level L1 is defined according to the kind of application being analyzed. For example, in the case of Pay TV Satellite Key Sharing, R'="image is descrambled" and the distance D(R, R')=0 if the test device is able to descramble the NV stream contained in one of the data streams by using the control words used in the test stream currently tested. In this case, we have a go/nogo status for the first and second predefined level. They have in this case the same value. The comparator can also decide to stop the iteration process until the granularity of the test stream is sufficiently small to be identified. In the case of an IP stream, the first iteration will be the whole IP stream. In the successive iterations, the SSC value can then change to either refine the range of the IP address or by selectively testing all IP addresses of the IP data stream.

The comparator, stream dispatcher and test device jointly constitute an analysis module.

The analysis described herein is performed as successive analysis iterations. Each analysis iteration generates a distance D calculation by the comparator. At each analysis iteration, the stream selector adjusts the parameters of the controlled filter until D=0. In order to do so, the stream selector instructs the controlled filter to generate appropriate test streams such that the amount of disabled sub-streams is increased at each analysis iteration. When the maximum level of granularity such that D=0 has been reached, the stream selector interrupts the process, provides as an output the last (e.g., most restrictive) values of the controlled filter that have led to D=0 and declares an identification success. Depending on the nature of the data stream input to the controlled filter, the granularity of the filtering may be at a Satellite Transport Stream level, at PID level, at an IP address level, or it may depend on any other information related to the header or to the content of the packets present in the data streams (i.e., pattern of the data packets). The granularity of the filtering may vary between two analysis iterations. In particular, it may be a given a hierarchical organization.

The successive analysis iteration is one method to converge to the content. The test stream is first selected from a large category, e.g., the streams having IP packets (as opposed to the streams having video data) for a first round of test. If the comparison is positive (i.e., the distance D is below the second predefined level L2 but not below the first predefined level L1), the controlled filter is set so has to have a finer granularity of the streams previously positively detected. In the negative case, the disabled streams of the previous round are now considered has having the content and these sub-streams are then applied to the controlled filter so has to elect one or more test streams among these sub-streams. This recursive approach allows a quick and efficient way to converge to the final sub-stream containing the content, until the comparator gives a distance value below the first predefined level L1.

This output of the stream selector can then sent to other modules that can take appropriate actions depending on the content of the output (e.g., generate emails, . . . )

The stream selector identifies the best strategy to modify the parameters of the controlled filters in order to minimize the overall time necessary to complete the analysis (i.e., to obtain the most restrictive parameters of the controlled filter such that D=0) and to minimize the instantaneous and total bandwidth necessary to transfer the test streams between the controlled filter and the stream dispatcher. In order to do so, the stream selector selects at each iteration which sub-streams must be removed or modified from the data stream (so as to keep only the test streams). The sub-stream characteristic (SSC) is used to determine which sub-stream will be part of the test stream. At each iteration, a new value or type is selected for the SSC by the stream selector via one of the following methods:

Sequential: The SSC type is fixed, the SSC value is modified with a known rule (random, predefined, learning, environment or a mix of those). within its possible ranges. (e.g., SSC type can be fixed to be of "IP address type"; then at each iteration the IP Address—e.g., the SSC value—is increased of one unit). This rule can be:

Random. The SSC value is modified randomly;

Predefined. The SSC value is modified with a predefined function (e.g., a fix constant value, unitary increase, two units decrease, . . . );

Current Analysis Learning (CAL): a memory is used to store the inputs/outputs of the previous analysis iterations (R, D, controlled filter configurations, previous SSC type/value). The CAL rule selects the modifications of the SSC value as a function of current inputs and its memory; or General Experience Learning (GEL): a memory is used to store the inputs/outputs of the previous analysis in the form of the SSC previously positively detected (either on the same application or on other applications). The GEL rule selects the modifications of the SSC value as function of current inputs and its memory.

Adaptive: The SSC type and SSC value are modified with predefined conditions, i.e., known rules (predefined, learning, environment or a mix of those) within their possible ranges. (e.g., SSC type can be a "Transport stream, then PID, then IP Address"; then at each iteration the SSC value—is increased by one unit).

The stream selector can predict the test streams where the content is most probably present and retrieve these streams in the right sequence, in order to save bandwidth and transmit only (or first) those to the test device. The likelihood of a test stream containing the content can be estimated by i) observations of the other Test Streams (patterns, behaviour, quantity of data that changes between two packets, . . . ) or ii) by prediction based on inferring from historical data (previous Analysis Iterations or previous analysis on the same application or other applications).

Since each test stream can contain a different number of data packets per second (i.e., different bandwidth), not all test streams have the same "analysis cost". The stream selector hence considers—in addition to the other parameters already discussed:

test stream probability (the probability that a given test stream contains the content); and test stream analysis cost (the cost to transfer/analyse that given test stream).

The test streams are sent to the analysis part in a way that minimizes the overall "analysis cost", such that $E[Ta]$ is minimal ($E[x]$ represents the statistical average and Ta is the Total analysis cost). $Ta=SUM(Ti) |:i=1$ to N; where N is the number of test stream analyzed before the identification success is declared. Ti is proportional to the "test stream bandwidth". N is function of the Pi distribution (the probability that a given test stream contains the content). Hence the tool will calculate the best sequence, considering the probability and cost of each stream and finding the best trade-off.

In the determination of the best sequence, the stream selector also takes care of identifying the sequence that would maximize the efficiency jointly on the transmission and central analysis (e.g., to ensure that at no moment the analysis module is waiting because of lag on the transmission line, nor that too much data accumulates while waiting to be analyzed).

The invention claimed is:

1. A method to identify a control word stream, said method comprising the steps of:

capturing at least one data stream at a reception device;

analyzing and filtering the data stream at the reception device by:

isolating at least one test control word stream of the data stream;

disabling other sub-streams;

synchronizing the at least one test control word stream with a scrambled reference audio/video content to create a modified data stream including both the scrambled reference audio/video content and the test control word data stream, and applying the modified data stream to an application on a test device so as to produce a descrambled audio/video content output; and applying the descrambled audio/video content output to a comparator, said comparator receiving a descrambled reference audio/video content and determining whether the descrambled audio/video content output is the same as the descrambled reference audio/video content;

wherein:

when the descrambled audio/video content output is the same as the descrambled reference audio/video content, declaring the test control word stream identified; and when the descrambled audio/video content output is not the same as the descrambled reference audio/video content, repeating the isolating, disabling, synchronizing and applying steps for a different test control word stream from the data stream not already applied to the application.

2. The method of claim 1, wherein the step of disabling the other sub-streams comprises the removal of the other sub-streams.

3. The method of claim 1, wherein the step of disabling the other sub-streams comprises the corruption of the other sub-streams.

4. The method of claim 1, wherein the data stream comprises signalization data indicating the sub-streams present in the data stream, and the step of disabling the other sub-streams comprises the removal of the indication of the other sub-streams in the signalization data.

5. The method of claim 1, wherein the test control word stream is identified by a type or a value, and the step of isolating the test control word stream comprises a random selection of the type and/or value.

6. The method of claim 1, wherein the test control word stream is identified by a type or a value, and further comprising storing the type or value of the test control word stream when the descrambled audio/video content output is the same as the descrambled reference audio/video content, and in a subsequent analysis, selecting the stored type or value of the test control word stream.

7. The method of claim 1, wherein the test control word stream is identified by a type or a value, further comprising selecting the type or value for the test control word stream according to predefined conditions.

8. The method of claim 1, wherein the content is contained in security messages for conditional access multimedia data or other specified DVB metadata.

9. The method of claim 1, wherein the application is a computer program executed by a processor.

10. A system for identifying at least one control word stream within a data stream, said system comprising:

a controlled filter adapted to capture at least one data stream, and analyze and filter the data stream by:

isolating at least one test control word stream of the data stream; and disabling other sub-streams;

a stream dispatcher adapted to synchronize the at least one test control word stream with a scrambled reference audio/video content to create a modified data stream including both the scrambled reference audio/video content and the at least one test control word stream, and apply the modified data stream to an application on a test device so as to produce a descrambled audio/video content output; and a comparator adapted to receive the descrambled audio/video content output and a descrambled reference audio/video content and determine whether the descrambled audio/video content output is the same as the descrambled reference audio/video content, wherein:

when the descrambled audio/video content output is the same as the descrambled reference audio/video content, the system is configured to declare the test control word stream identified; and when the descrambled audio/video content output is not the same as the descrambled reference audio/video content, the system is configured to repeat processing performed by the controlled filter, the stream dispatcher and the comparator for a different test stream from the data stream not already applied to the application.

11. The system of claim 10, wherein the other sub-streams are disabled by removing the other sub-streams.

12. The system of claim 10, wherein the other sub-streams are disabled by the corruption of the other sub-streams.

13. The system of claim 10, wherein the data stream comprises signalization data indicating the sub-streams present in the data stream, and the other sub-streams are disabled by the removal of the indication of the other sub-streams in the signalization data.

14. The system of claim 10, wherein the test control word stream is identified by a type or a value, and isolating the test control word stream comprises a random selection of the type and/or value.

15. The system of claim 10, wherein the test control word stream is identified by a type or a value, and wherein the type or value of the test control word stream when the descrambled audio/video content output is the same as the descrambled reference audio/video content is stored, and wherein in a subsequent analysis, the stored type or value for the test control word stream is selected.

16. The system of claim 10, wherein the test control word stream is identified by a type or a value, and wherein the type or value for the test control word stream is selected according to predefined conditions.

17. The system of claim 10, wherein the content is contained in security messages for conditional access multimedia data or other specified DVB metadata.

18. The system of claim 10, wherein the application is a computer program executed by a processor.

19. The method of claim 1, wherein the control word stream includes a plurality of entitlement control messages (ECMs), each ECM including at least one control word.

* * * * *